US006965573B1

(12) United States Patent
Mizukoshi

(10) Patent No.: US 6,965,573 B1
(45) Date of Patent: Nov. 15, 2005

(54) NETWORK SYSTEM

(75) Inventor: Yasuhiro Mizukoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 773 days.

(21) Appl. No.: 09/694,004

(22) Filed: Oct. 23, 2000

(30) Foreign Application Priority Data

Oct. 22, 1999 (JP) ................................. 11-300438

(51) Int. Cl.[7] .......................................... H04L 12/26
(52) U.S. Cl. ..................................... 370/252; 370/389
(58) Field of Search ................................ 370/241, 252, 370/253, 246, 250, 389; 375/224, 225

(56) References Cited

U.S. PATENT DOCUMENTS

| | | | | |
|---|---|---|---|---|
| 5,367,523 A | * | 11/1994 | Chang et al. | 370/235 |
| 5,802,106 A | * | 9/1998 | Packer | 375/225 |
| 5,828,837 A | | 10/1998 | Eikeland | |
| 5,892,754 A | * | 4/1999 | Kompella et al. | 370/236 |
| 5,936,940 A | * | 8/1999 | Marin et al. | 370/232 |
| 6,128,316 A | * | 10/2000 | Takeda et al. | 370/468 |
| 6,249,530 B1 | * | 6/2001 | Blanco et al. | 370/468 |
| 6,341,309 B1 | * | 1/2002 | Vaid et al. | 709/223 |
| 6,560,198 B1 | * | 5/2003 | Ott et al. | 370/235 |
| 6,577,646 B2 | * | 6/2003 | Takeda et al. | 370/468 |
| 6,654,344 B1 | * | 11/2003 | Toporek et al. | 370/230 |
| 6,658,482 B1 | * | 12/2003 | Chen et al. | 709/245 |
| 6,757,255 B1 | * | 6/2004 | Aoki et al. | 370/252 |

FOREIGN PATENT DOCUMENTS

| | | |
|---|---|---|
| EP | 0 719 012 A2 | 6/1996 |
| EP | 0 948 168 A1 | 10/1999 |
| JP | 11112543 | 4/1999 |
| JP | A 2000-278320 | 10/2000 |
| JP | A 2001-69146 | 3/2001 |

OTHER PUBLICATIONS

"Bandwidth pING," The CAIDA Web Site, Online! 1995, pp. 1-6.
"Traceroute Program," TCP/IP Illustrated, V. 1, pp. 97-110.

* cited by examiner

Primary Examiner—Chau Nguyen
Assistant Examiner—Joshua Kading
(74) Attorney, Agent, or Firm—Young & Thompson

(57) ABSTRACT

Disclosed is a network system that has: a communication line having a predetermined bandwidth; a terminal unit that is connected to the communication line and receives data through the communication line; a first unit that includes the terminal unit through the communication line and repeats data to be communicated between the terminal unit and the first unit; and a second unit that sends data to the terminal unit through the first unit according to a bandwidth of the terminal unit that is estimated based on a data delay time of the communication line.

9 Claims, 15 Drawing Sheets

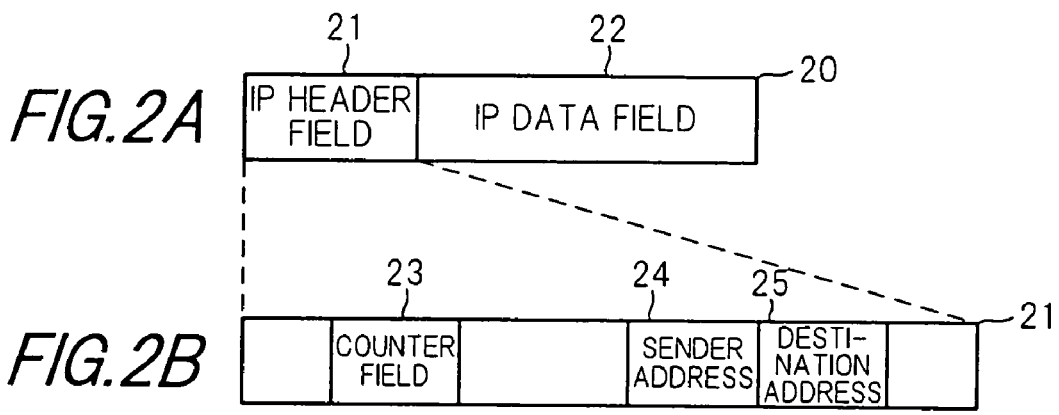
FIG.2A
FIG.2B
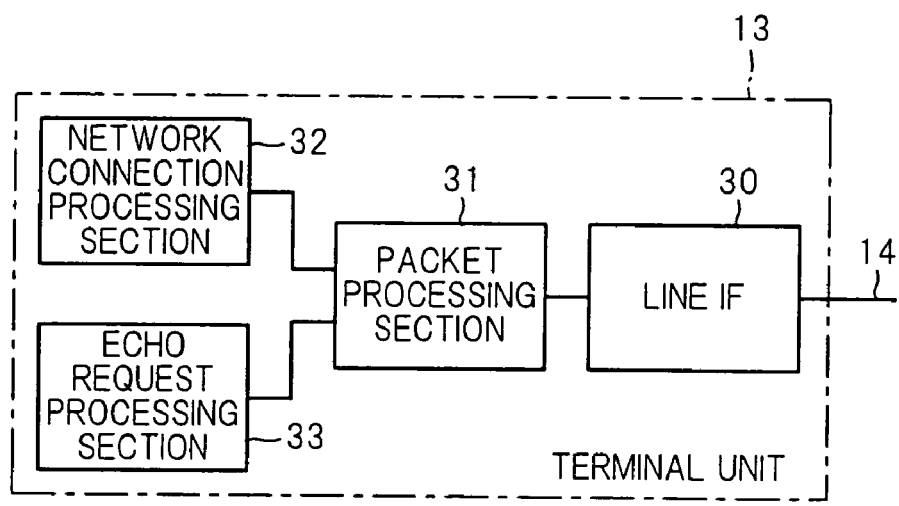
FIG.3

FIG. 9

| t | RTT$_2$ | JUDGEMENT RESULTS |
|---|---|---|
| LARGE | SMALL | TERMINAL UNIT IS CONNECTED THRU NARROW-BAND LINE |
| SMALL | LARGE | TERMINAL UNIT IS CONNECTED WITH DISTANT NETWORK |
| LARGE | LARGE | TERMINAL UNIT IS CONNECTED THRU NARROW-BAND LINE WITH DISTANT NETWORK |
| SMALL | SMALL | TERMINAL UNIT IS CONNECTED THRU BROAD-BAND LINE WITH NEAR NETWORK |

FIG. 10

| t[ms] | LINE BANDWIDTH [bps] |
|---|---|
| MORE THAN 500 | LESS THAN 9600 |
| 250~500 | 9600~32k |
| 180~250 | 32k |
| LESS THAN 180 | 64k |

NETWORK SYSTEM

FIELD OF THE INVENTION

This invention relates to a network for a terminal unit to receive various data, and more particularly to, a network system including a terminal unit that receives data transferred from a server on a network through a line.

BACKGROUND OF THE INVENTION

In recent years, the Internet with computer networks connected each other has been rapidly in wide use, thereby various services such as email, net news, download of moving picture or audio data and TV conference system have been supplied. The supplying of the various services is mainly supported by the enhancement in performance of computer and the progress of network communication technology. As the various services become widely used, terminal units to use the service have become also multiform. For example, as the multiform terminal units, there are home-use personal computers through conventional public telephone line, office-use computers through broadband dedicated line, and portable terminal units such as a personal digital assistant (PDA) and a cellular phone through wireless communication line.

In using the various services on the Internet, it is necessary to set the communication line between a terminal unit and an application server to supply the various services on the Internet. In this regard, the setting of communication bandwidth is conducted so that the resource in network can be used effectively and thereby the terminal unit subject to the service can be comfortably serviced. Thus, the various service data are transferred from the application server.

In setting the communication bandwidth, it is necessary to know the bandwidth of line between the application server and the terminal unit. Therefore, in conventional network systems, for example, bandwidth information is sent from the terminal unit to the application server, and through a communication line to be set based on this information, various service data are transferred from the application server to the terminal unit.

On the other hand, Japanese patent application laid-open No. 11-112543 (1999) discloses a data communication method and a repeater used in the method. In the network system to which this method is applied, in order to conduct the data transfer using an optimum bandwidth, the repeater that stores in advance communication bandwidths to be set to respective communication identification information secures a communication bandwidth according to the communication identification information of repeating data received. Thereby, sending the bandwidth information and further installing a specific bandwidth securing protocol becomes unnecessary.

However, in the conventional network system that bandwidth information is sent before the start of communication, the terminal unit has to be equipped with an additional unit for sending the bandwidth information. So, there is a problem that the system prevents the mobile terminal from being miniaturized and lightened and lays all of various terminals such as the existing Internet system under need for being equipped with the like function.

Also, it is practically difficult to apply the technology disclosed in Japanese patent application laid-open No. 11-112543 to a network composing the existing Internet. Because, especially in case of the Internet with various networks connected each other, all the networks, not a specific network, need to be adapted to the technology.

On the other hand, concerning the various networks connected each other in the Internet, the communication bandwidth between them is broad. In contrast, the line between the terminal unit and an access server included in the Internet for connection with this terminal unit is of narrow bandwidth. Therefore, the bandwidth of communication line to be set between the terminal unit and the application server often depends on the bandwidth of line between the terminal unit and the access server. Namely, if the bandwidth of line between the terminal unit and the access server were known, the resource in network would be used effectively and thereby the terminal unit subject to the service would be comfortably serviced, so that the various service data could be transferred from the application server.

SUMMARY OF THE INVENTION

Accordingly, it is an object of the invention to provide a network system that achieves the optimum data transfer between a terminal unit and an application server without requiring the connection information about the bandwidth of communication line therebetween from the terminal unit.

It is a further object of the invention to provide a network system that is capable of being easily applied to the existing Internet system.

According to the invention, a network system, comprises:
a communication line having a predetermined bandwidth;
a terminal unit that is connected to the communication line and receives data through the communication line;
a first unit that includes the terminal unit through the communication line and repeats data to be communicated between the terminal unit and the first unit; and
a second unit that sends data to the terminal unit through the first unit according to a bandwidth of the terminal unit that is estimated based on a data delay time of the communication line.

According to another aspect of the invention, a network system, comprises:
a communication line having a predetermined bandwidth;
a terminal unit that is connected to the communication line and receives data through the communication line;
a first unit that includes the terminal unit through the communication line and repeats data to be communicated between the terminal unit and the first unit; and
a second unit that comprises a first measuring means that is connected to the first unit and measures a first round trip time as a data delay time between the terminal unit and the second unit, a second measuring means that measures a second round trip time as a data delay time between the first unit and the second unit, a communication line delay calculating means that calculates the data delay time of the communication line from the first and second round trip times measured by the first and second measuring means, respectively, a communication line bandwidth storing means that stores a bandwidth of the communication line corresponding to the data delay time of the communication line, and a data sending means that sends data to the terminal unit according to the bandwidth of the communication line stored in the communication line bandwidth storing means corresponding to the data delay time calculated by the communication line delay calculating means.

According to another aspect of the invention, a network system, comprises:

a terminal unit that sends an echo response with a predetermined counter value to the sender of a predetermined echo request;

an access server that includes the terminal unit through a communication line and repeats data and the echo request to be communicated between the terminal unit and the access sever, decrements a count value of the echo request every time repeating the echo request, and, when the count value becomes zero, sends an echo response to the sender of the echo request;

one or more routers that are connected to the access server, repeats data and the echo request to be communicated between the terminal unit and the routers, decrements a count value of the echo request every time repeating the echo request, and, when the count value becomes zero, sends an echo response to the sender of the echo request; and an application server that is connected to any one of the routers, the application server comprising a first echo request sending means that sends a first echo request to the terminal unit, a first echo response receiving means that receives a first echo response in reply to the first echo request from the terminal unit, a first measuring means that measures a first round trip time as a data delay time between the terminal unit and the application server, the first round trip time being an elapsed time from send time of the first echo request until receive time of the first echo response, an estimating means that estimates the number of routers up to the access server from a counter value of the first echo response received by the first echo response receiving means, a second echo request sending means that sends a second echo request with a count value that is set to be the number of routers estimated by the estimating means to the terminal unit, a second echo response receiving means that receives a second echo response in reply to the second echo request, a second measuring means that measures a second round trip time as a data delay time between the access server and the application server, the second round trip time being an elapsed time from send time of the second echo request until receive time of the second echo response, a communication line delay calculating means that calculates a data delay time of the communication line from the first and second round trip times measured by the first and second measuring means, respectively, a communication line bandwidth storing means that stores a bandwidth of the communication line corresponding to the data delay time of the communication line, and a data sending means that sends data to the terminal unit according to the bandwidth of the communication line stored in the communication line bandwidth storing means corresponding to the data delay time calculated by the communication line delay calculating means.

BRIEF DESCRIPTION OF THE DRAWINGS

The invention will be explained in more detail in conjunction with the appended drawings, wherein:

FIGS. 2A and 2B are explanatory diagrams showing the composition of data to be communicated in the network system in the embodiment;

FIG. 3 is a block diagram showing the composition of a terminal unit concerning the estimation control of line bandwidth in the embodiment;

FIG. 9 is a table showing the content of a first criterion table in the embodiment;

FIG. 10 is a table showing the content of a second criterion table in the embodiment;

DESCRIPTION OF THE PREFERRED EMBODIMENTS

The preferred embodiment of the invention will be explained below.

Figure 1:
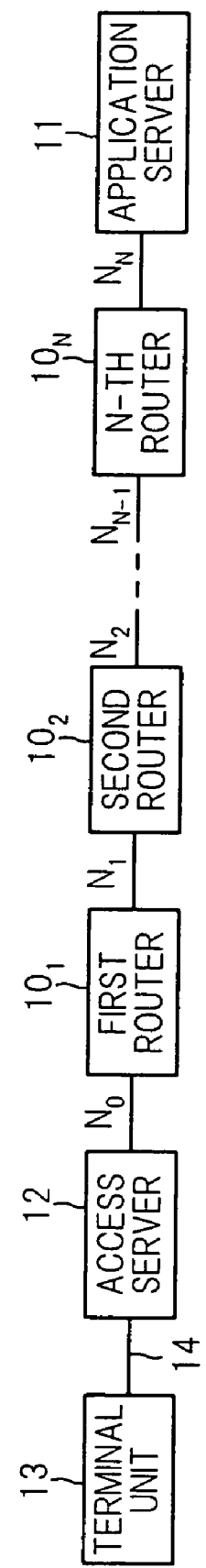
FIG. 1 is an explanatory diagram showing the schematic composition of a network system in a preferred embodiment according to the invention.

FIG. 1 shows the schematic composition of a network system in the preferred embodiment according to the invention. In the network system of the embodiment, multiple networks $N_0$ to $N_N$ are connected through first to N-th routers $10_1$ to $10_N$, respectively. The first to N-th routers $10_1$ to $10_N$, respectively, conduct the repeat processing of packet data to be transferred between networks connected, on the network layer of open systems interconnection (OSI) basic reference model. Various network devices such as a personal computer are connected with the networks $N_0$ to $N_N$. In this example, an application server 11 to store contents data as service data for offering various services is connected with the network $N_N$.

In getting contents data being stored in the application server 11 by accessing the Internet that is composed of the networks $N_0$ to $N_N$, it is necessary to connect a terminal unit to any one of the networks $N_0$ to $N_N$, like the application server 11, directly or through an access server included in any one of the networks $N_0$ to $N_N$. In case of being directly connected to any one of the networks $N_0$ to $N_N$, the terminal unit needs to be included in a dedicated network and is connected through the router to any one of the networks $N_0$ to $N_N$. On the other hand, in case of being connected through the access server, the terminal unit needs to be connected to the access server through public telephone line or wireless communication line that is of a significantly narrow-band line compared with the dedicated network. Especially home-use personal computers, and portable terminal units such as PDA and cellular phone need the access server in accessing the Internet.

In the network system of the embodiment, it is given that an access server 12 is included in the network $N_0$ and the terminal unit 13 is connected with the access server 12 through a line 14 such as public telephone network, cellular network and PHS (personal handy-phone system).

The first to N-th routers $10_1$ to $10_N$, application server 11, access server 12 and terminal unit 13, respectively, are provided with unique address, by which they can be identified each other.

Of the communication route sections between the application server 11 and terminal unit 13, the line 14 between the access server 12 and the terminal unit 13 is, as described earlier, provided with a considerably narrow bandwidth compared with the other route sections. In the network system of the embodiment, therefore, based on the consideration that the communication bandwidth between the application server 11 and the terminal unit 13 depends on the line 14 between the access server 12 and the terminal unit 13, the system is enabled to estimate the bandwidth of the line 14. Namely, since the bandwidth of the line 14 corresponds to the data delay time of the line 14, the data delay time of the line 14 is measured using an echo request to be sent from the application server 11 and an echo response to be sent, in reply to the echo request, from the network device (terminal unit 13). Then, the application server 11 estimates the bandwidth of the line 14 according to the data delay time measured of the line 14, and based on the bandwidth estimated, contents data being requested by the terminal unit 13 is transferred. Thereby, the system enables the terminal unit 13 to comfortably receive the contents data while using effectively the resource of the networks $N_0$ to $N_N$.

FIGS. 2A and 2B show the schematic composition of data to be communicated through the networks $N_0$ to $N_N$ in this embodiment. The echo request, echo response and contents data, respectively, that are communicated through the networks $N_0$ to $N_N$ compose an IP (Internet protocol) packet data 20 in FIG. 2A. The IP packet data 20 is composed of an IP header field 21 that various control information for disassembly and assembly of data and for communication route control is located, and an IP data field 22 that disassembled packet data to be communicated is located. The IP header field 21 is, as shown in FIG. 2B, composed of a counter field 23 that a counter value to indicate the number of routers allowed to be passed through, a sender address 24 that a unique address assigned to a network device, the sender of data, is located, and a destination address 25 that a unique address assigned to a network device, the destination of data is located.

For example, in case of IP packet data to be transferred from the application server 11 to the terminal unit 13, the address of the application server 11 is located in the sender address 24, the address of the terminal unit 13 is located in the destination address 25, such a counter value as not to make the data stay in the networks $N_0$ to $N_N$ during a long time for some reason is located in the counter field 23, and the contents data to be sent is located in the IP data field 22. The counter value of the counter field 23 is set to have an initial value by the sender, and then is decremented by one every time IP packet data is passed through the router or access server. When the counter value becomes zero, the IP packet data itself is discarded without repeating any more.

The echo request and the echo response also have a similar composition to that of the IP packet data carrying the contents data. However, in the IP data field thereof, a control message of Internet control message protocol (ICMP) is located. The control message of ICMP allows identifying whether the IP packet data is echo request or echo response. The application server 11 sends the echo request having the counter field with a proper initial value written, to the terminal unit 13 as the destination. If the counter value becomes zero at the router or access server before the data reaches the terminal unit 13, the ICMP time exceeded message is sent to the sender of echo request instead of the echo reponse as a replay. In this invention, the sender of the echo request, the application server 11, deals with the ICMP time exceeded message as the echo response. When the data reaches the terminal unit 13 as the destination, the echo response having the counter field with a proper initial value written is sent as a reply.

The details of the network system in this embodiment that the bandwidth of the line 14 between the access server 12 and the terminal unit 13 is estimated by communicating such an IP packet data are explained below.

FIG. 3 shows the schematic composition of the terminal unit 13 in this embodiment concerning the above-mentioned bandwidth estimation control of the line 14. The terminal unit 13 is composed of a line interface (IF) 30 that includes the line connected to the access server 12, a packet processing section 31 that conducts the disassembly and assembly of IP packet data to be communicated through the line 14 with the access server 12, a network connection processing section 32 that sets a communication route through the access server 12 up to the application server 11 on the Internet composed of the networks $N_0$ to $N_N$, and an echo request processing section 33 that sends the echo response in reply to the echo request from the application server 11.

The terminal unit 13 thus composed, in the form of IP packet data, requests the setting of a communication route up to the application server 11, thereby getting contents data through the communication route being set, and sends the echo response in reply to the echo request from the application server 11. The terminal unit 13 has a CPU (central processing unit) not shown, thereby it can conduct the above various controls based on a control program stored in a given storage.

Figure 4:
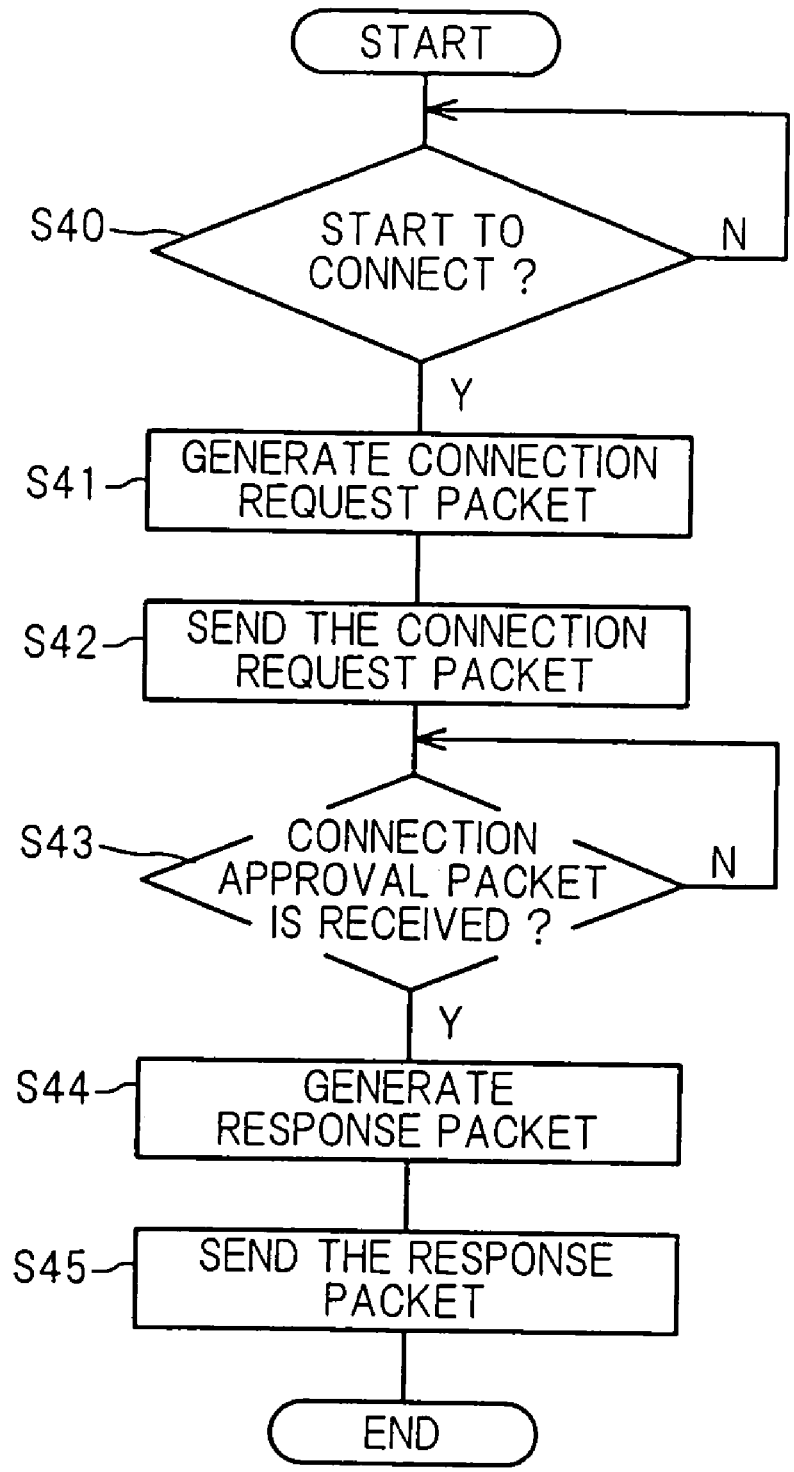
FIG. 4 is a flow chart showing the connection processing of communication route between the terminal unit and an application server in the embodiment.

FIG. 4 shows the outline of connection processing of communication route up to the application server 11 to be conducted by the terminal unit 13 in this embodiment before getting the contents data. Meanwhile, it is given that the line 14 between the terminal unit 13 and the access server 12 is already set. In the terminal unit 13, the network connection processing section 32 starts the connection processing of communication route up to the application server 11 for getting the contents data (step S40:Y), and then the packet processing section 31 generates a connection request packet having the composition of IP packet data in FIG. 2A (step S41). In this connection request packet, the addresses of the terminal unit 13 and the application server 11 are located in the sender address and destination address, respectively, and data to indicate the connection request is located in the IP data field. In the counter field, such a counter value as to discard the data without being stayed in the networks during a long time for some reason is located. Then, the connection request packet is sent from the line IF 30 through the line 14 to the access server 12 (step S42).

When the access server 12 receives the connection request packet from the terminal unit 13, it refers to at least the destination address and repeats this to the communication route being preset.

After sending the connection request packet, the packet processing section 31 of the terminal unit 13 monitors the reception of a connection approval packet to indicate the connection approval in reply to the connection request from the application server 11 subjected to the connection request (step S43:N). When the reception is detected (step S43:Y), a response packet to confirm the reception of the connection approval is generated (step S44). In the connection approval packet, the addresses of the application server 11 and the terminal unit 13 are located in the sender address and destination address, respectively, and data to indicate the connection approval is located in the IP data field. In the counter field, such a counter value as to discard the data without being stayed in the networks during a long time for some reason is located. In like manner, in the response packet, the addresses of the terminal unit 13 and the application server 11 are located in the sender address and destination address, respectively, and data to indicate the response in reply to the connection approval is located in the IP data field. In the counter field, such a counter value as to discard the data without being stayed in the networks during a long time for some reason is located. The terminal unit 13 sends this response packet to the access server 12 through the line 14 (step S45), and then finishes the processing thus far.

When the communication route up to the application server 11 is thus set according to the connection request of the terminal unit 13, an echo request is first sent from the application server 11 to the terminal unit 13.

Figure 5:
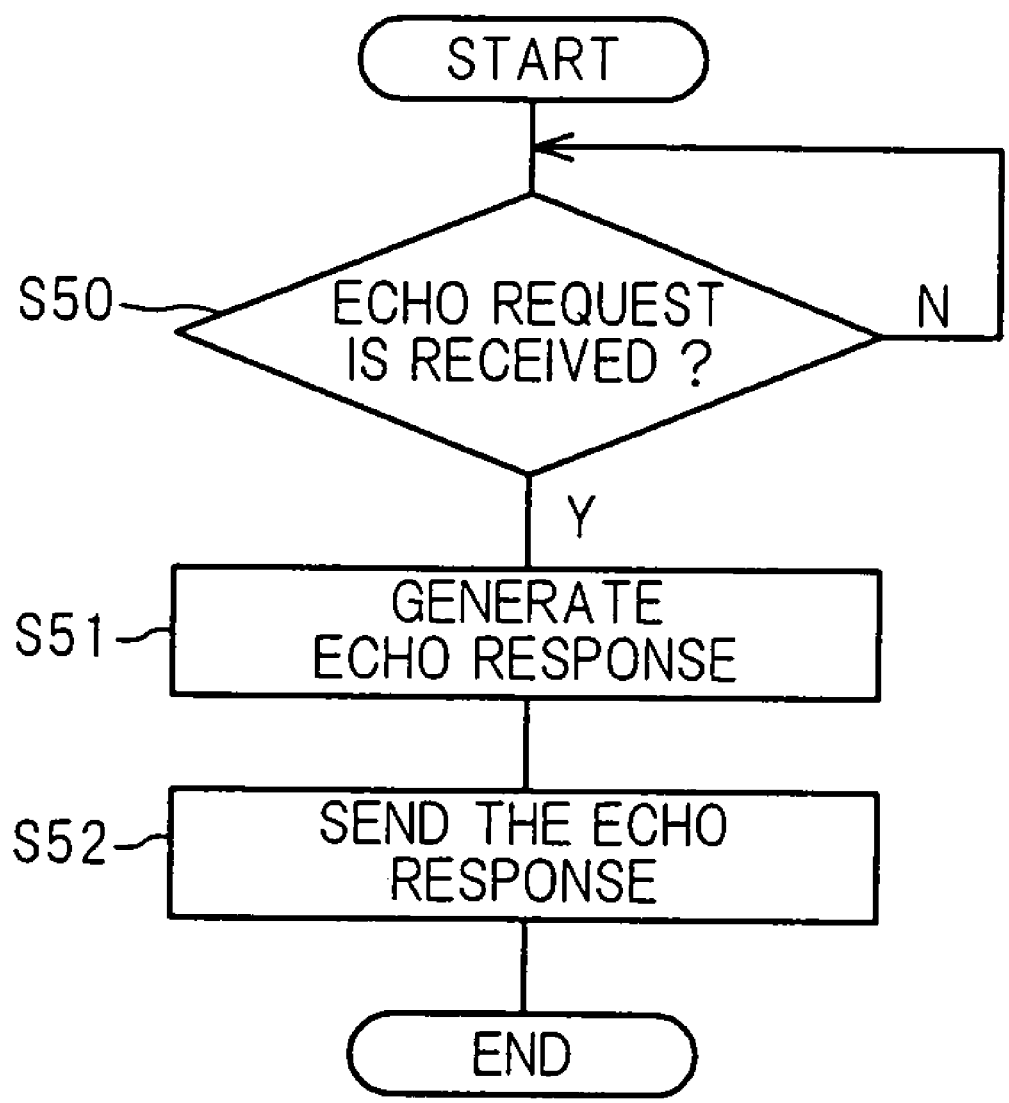
FIG. 5 is a flow chart showing the echo processing between the terminal unit and the application server in the embodiment.

FIG. 5 shows the outline of the echo request processing by the terminal unit 13 in this embodiment. The echo request processing section 33 of the terminal unit 13 monitors the reception of echo request from the application server 11 (step S50:N). When the reception of echo request is detected from the control message of ICMP in the IP data field of an IP data packet received (step S50:Y), an echo response that the sender address, i.e. the address of application server 11, in the echo request received is written into the destination address, the address of the terminal unit 13 is written into the sender address, and data to indicate the echo response with the control message of ICMP is located in the IP data field is generated (step S51). In the counter field, such a counter value with several bits assigned as not to make the data stay in the networks during a long time for some reason is located. Since the number of routers passed through between the terminal unit 13 and application server 11 is normally less than 30, more than five bits are assigned to the counter field. Thus, as the initial value of the counter value, a numeral that is easy to estimate, e.g. "32", "128" and "255", is used.

The echo response thus generated is again sent from the packet processing section 31 through the line 14 to the access server 12 (step S52). When the access server 12 receives the echo response from the terminal unit 13, it refers to at least the destination address and repeats this to the communication route being preset.

The details of the access server 12 and the first to N-th routers $10_1$ to $10_N$ are explained below. Meanwhile, in the composition of these devices, part concerning the line estimation control in this embodiment is substantially common each other, therefore the explanation below relates to only the access server 12.

Figure 6:
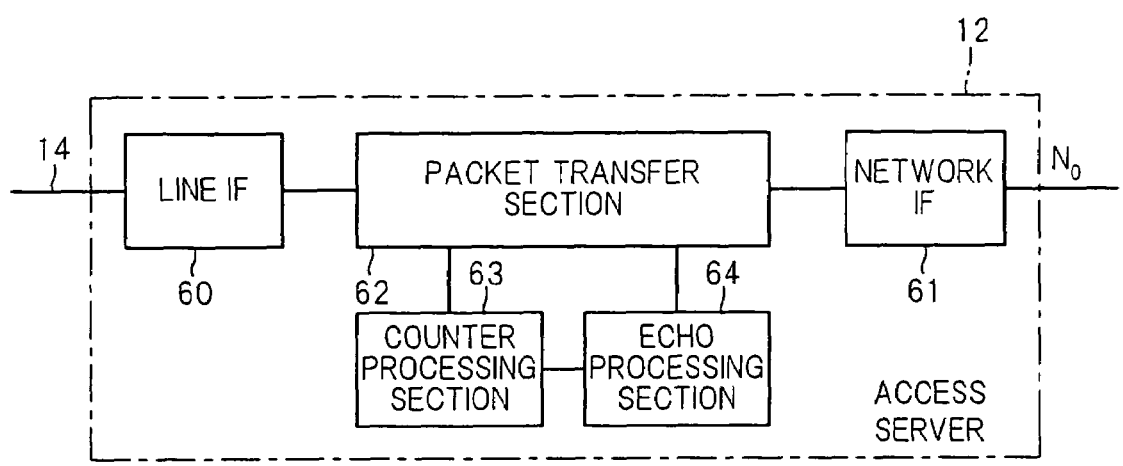
FIG. 6 is a block diagram showing the composition of an access server concerning the estimation control of line bandwidth in the embodiment.

FIG. 6 shows the schematic composition of the access server 12 in this embodiment concerning the line estimation control of the line 14. The access server 12 is composed of a line IF 60 including the line 14 connected to the terminal unit 13, a network IF 61 having the interface function with the network $N_0$, a packet transfer section 62 that conducts the repeat processing of IP packet data between the line 14 and the network $N_0$, a counter processing section 63 that, based on a counter value in the counter field of a IP packet data repeated, determines whether to discard the data or to send the echo response, and an echo processing section 64 that conducts the echo response processing based on the determination result of the counter processing section 63.

The access server 12 thus composed has a CPU (not shown), thereby it can conduct the above various controls based on a control program stored in a given storage.

Figure 7:
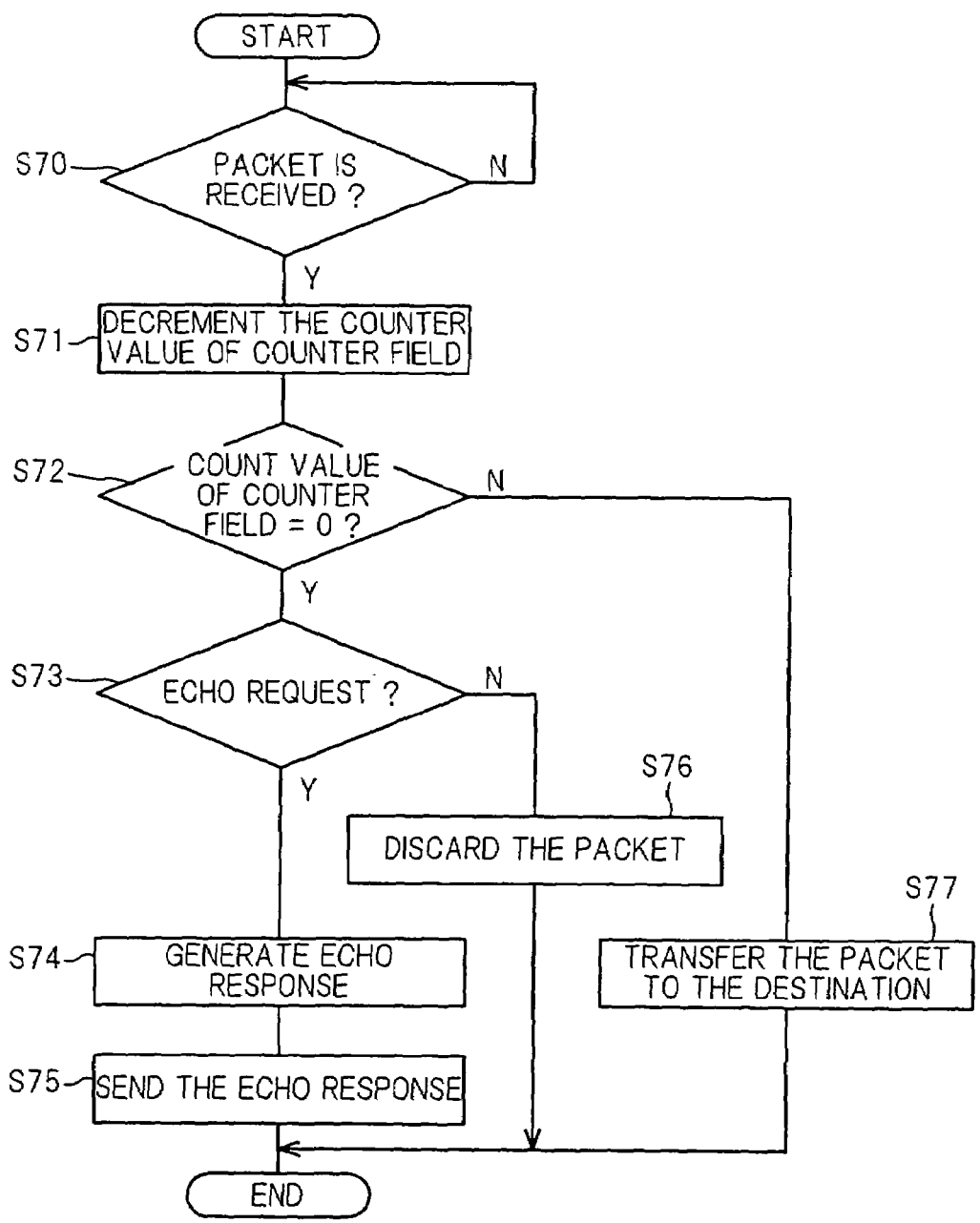
FIG. 7 is a flow chart showing the packet repeat processing of the access server in the embodiment.

FIG. 7 shows the outline of repeat processing by the access server 12 in this embodiment. The packet transfer section 62 of the access server 12 monitors the reception of IP packet data through the line IF 60 or the network IF 61 (step S70:N). When the reception is detected (step S70:Y), the counter value in the counter field of an IP packet data received is decremented by one in the counter processing section 63 (step S71). Then, it is judged whether the counter value decremented in the counter field is zero or not (step S72). If judged the counter value is zero (step S72:Y), then it is judged whether the IP packet data received is an echo request or a normal IP packet data, by referring to the IP data field thereof (step S73).

If judged the IP packet data received is an echo request (step S73:Y), then an echo response is generated by the echo processing section 64 (step S74). Then, the echo processing section 64 sends, as a reply, the echo response that the sender address of the echo request received is written into the destination address, through the packet transfer section 62 to the destination address (step S75), and then the processing thus far is finished (end).

If at step S73 it is judged that the IP packet data received is, not the echo request, e.g. a normal packet data carrying contents data sent from the application server 11 (step S73:N), the packet data is discarded without repeating (step S76). Then, the discard notification is sent to a sender identified from the sender address of the packet data discarded, and then the processing thus far is finished (end). Meanwhile, in this embodiment, the discard notification is also sent as an echo response.

If at step S72 it is judged that the counter value of the IP packet data received is not zero (step S72:N), the packet data is transferred to the destination designated by the destination address of the echo request (step S77), and then the processing thus far is finished (end).

The main composition of the first to N-th routers $10_1$ to $10_N$ concerning the line estimation control in this embodiment is similar to that of the access server 12 in FIG. 6, therefore the explanation thereof is omitted here. However, different from the access server 12, the first to N-th routers $10_1$ to $10_N$ are not equipped with the ine IF 60, and instead of this, they have the network interface function to offer the connection through the network IF 61. Also, the operation of the main composition of the first to N-th routers $10_1$ to $10_N$ concerning the line estimation control in this embodiment is similar to that of the access server 12 in FIG. 7, therefore the explanation thereof is omitted here.

The details of the application server 11 are explained below.

Figure 8:
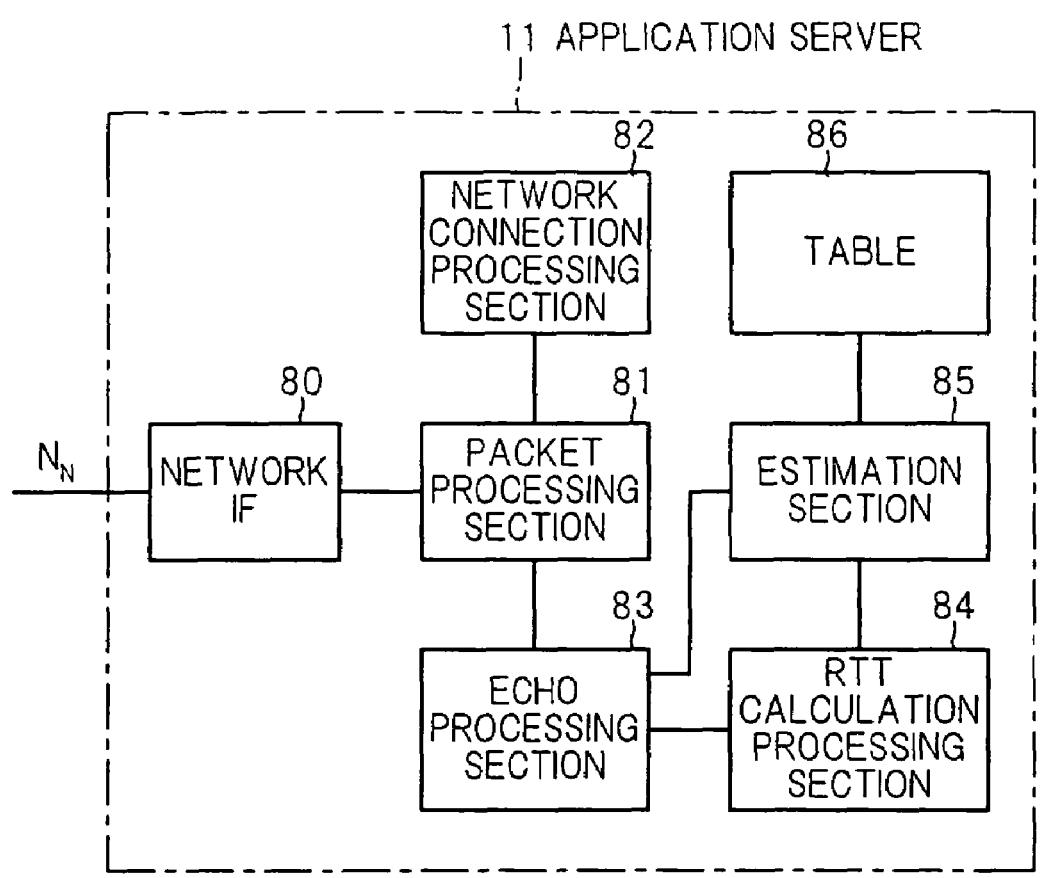
FIG. 8 is a block diagram showing the composition of the application server concerning the estimation control of line bandwidth in the embodiment.

FIG. 8 shows the schematic composition of the application server 11 in this embodiment concerning the line estimation control of the line between the terminal unit 13 and the access server 12. The application server 11 is composed of: a network IF 80 having the interface function with the network $N_N$; a packet processing section 81 that conducts the assembly and disassembly of IP packet data to be communicated between the application server 11 and the network $N_N$; a network connection processing section 82 that sets the communication route up to the terminal unit 13 through the access server 12 included in the Internet composed of the networks $N_0$ to $N_N$; an echo processing section 83 that conducts the transmission of echo request to the terminal unit 13 and the reception of echo response from the terminal unit 13; an RTT calculation processing section 84 that calculates a round trip time (RTT), a data delay time in communication route, from send (=transmit) time and receive time of echo request and echo response, respectively, by the echo processing section 83; an estimation section 85 that estimates the bandwidth of the line 14 based on the processing results of the echo processing section 83 and the RTT calculation processing section 84; and a table 86 that stores criteria in estimating the bandwidth of the line 14 by the estimation section 85.

The application server 11 thus composed sends the echo request to the terminal unit 13 when the communication route up to the terminal unit 13 is set by the network connection processing section 82, and then waits for the reception of the echo response, in reply to the echo request, sent from the terminal unit 13. When the echo response is received, the RTT calculation processing section 84 calculates a RTT, $RTT_1$, in the communication route set by the network connection processing section 82, from send time of the echo request and receive time of the echo response. Although in this example the RTT is measured from send time of the echo request and receive time of the echo response, it may be measured by starting the clocking of a timer at the transmission of echo request and then stopping the clocking at the reception of echo response. In brief, the elapsed time from the transmission of echo request until the reception of echo response only has to be known.

Then, the estimation section 85 estimates an initial counter value in the counter field set by the terminal unit 13, the sender, from the counter value in the counter field of the echo response received. Thereby, the number of routers between the application server 11 and the terminal unit 13 can be specified. Then, the echo processing section 83 sends an echo request to the access server 12 that is located prior to the terminal unit 13, thereby the application server 11 can know a RTT, $RTT_2$, of the communication route between the application server 11 and the access server 12.

Accordingly, representing the data delay time of the line 14 by "t", the t is given by equation (1) below.

$$t=RTT_1-RTT_2 \quad (1)$$

The application server 11 judges whether the line 14 is a narrow-band line or broad-band line, from the data delay time t calculated by equation (1). If judged a broad-band line, it sets the maximum communication bandwidth of the communication route up to the terminal unit 13, then transferring the contents data. Also, if judged a narrow-band line, it sets a communication bandwidth corresponding to the data delay time t of the line 14, then transferring the contents data.

Thus, the application server 11 is provided with the table 86 having first and second criterion tables 90 and 95, described below, that are used as the criteria for the bandwidth estimation of the line 14.

FIG. 9 shows an example of the first criterion table 90 used in judging whether the line 14 is a narrow-band line or broad-band line. In the first criterion table 90, the results of judgement are defined corresponding to the data delay time t of the line 14 and the RTT, $RTT_2$, between the application server 11 and the access server 12. The data delay time t of the line 14 and the $RTT_2$ each are binarized into "large" and "small". In this example, given that the packet size of echo request is around 100 bytes, more than 100 ms is defined as the "large" and less than 100 ms is defined as the "small".

In this way, if the data delay time t of the line 14 is more than 100 ms ("large") and the $RTT_2$ is less than 100 ms ("small"), then it is judged that the line 14 is of the narrow-band line in communication and the terminal unit 13 is connected with a near network due to the small $RTT_2$ to indicate the short distance up to the access server 12. Also, if the data delay time t of the line 14 is less than 100 ms ("small") and the $RTT_2$ is more than 100 ms ("large"), then it is judged that the line 14 is of the broad-band line in communication and the terminal unit 13 is connected with a distant network due to the large $RTT_2$ to indicate the long distance up to the access server 12. If the data delay time t of the line 14 is more than 100 ms ("large") and the $RTT_2$ is more than 100 ms ("large"), then it is judged that the line 14 is of the narrow-band line in communication and the terminal unit 13 is connected with a distant network due to the large $RTT_2$ to indicate the long distance up to the access server 12. If the data delay time t of the line 14 is less than 100 ms ("small") and the $RTT_2$ is less than 100 ms ("small"), then it is judged that the line 14 is of the broad-band line in communication and the terminal unit 13 is connected with a near network due to the small $RTT_2$ to indicate the short distance up to the access server 12.

On the other hand, the second criterion table 95 is a table to determine the bandwidth of the line 14 so as to transfer the contents data from the application server 11 at an optimum bandwidth when the line 14 is judged as the narrow-band line based on the first criterion table 90.

FIG. 10 shows an example of the second criterion table 95 used in determining the bandwidth of the line 14. In the second criterion table 95, the bandwidth of the line 14 to be determined is defined corresponding to the data delay time t of the line 14. Namely, if the data delay time t of the line 14 is more than 500 ms, then the bandwidth of the line 14 is determined to be less than 9600 bps. If the data delay time t of the line 14 is 250 ms to 500 ms, then the bandwidth of the line 14 is determined to be 9600 bps to 32 kbps. If the data delay time t of the line 14 is 180 ms to 250 ms, then the bandwidth of the line 14 is determined to be 32 kbps. If the data delay time t of the line 14 is less than 180 ms, then the bandwidth of the line 14 is determined to be 64 kbps.

The details of the line estimation control by the application server 11 are explained below.

The application server 11 has a CPU (not shown), thereby it can conduct the above various controls such as the estimation control of line bandwidth etc. based on a control program stored in a given storage.

Figure 11:
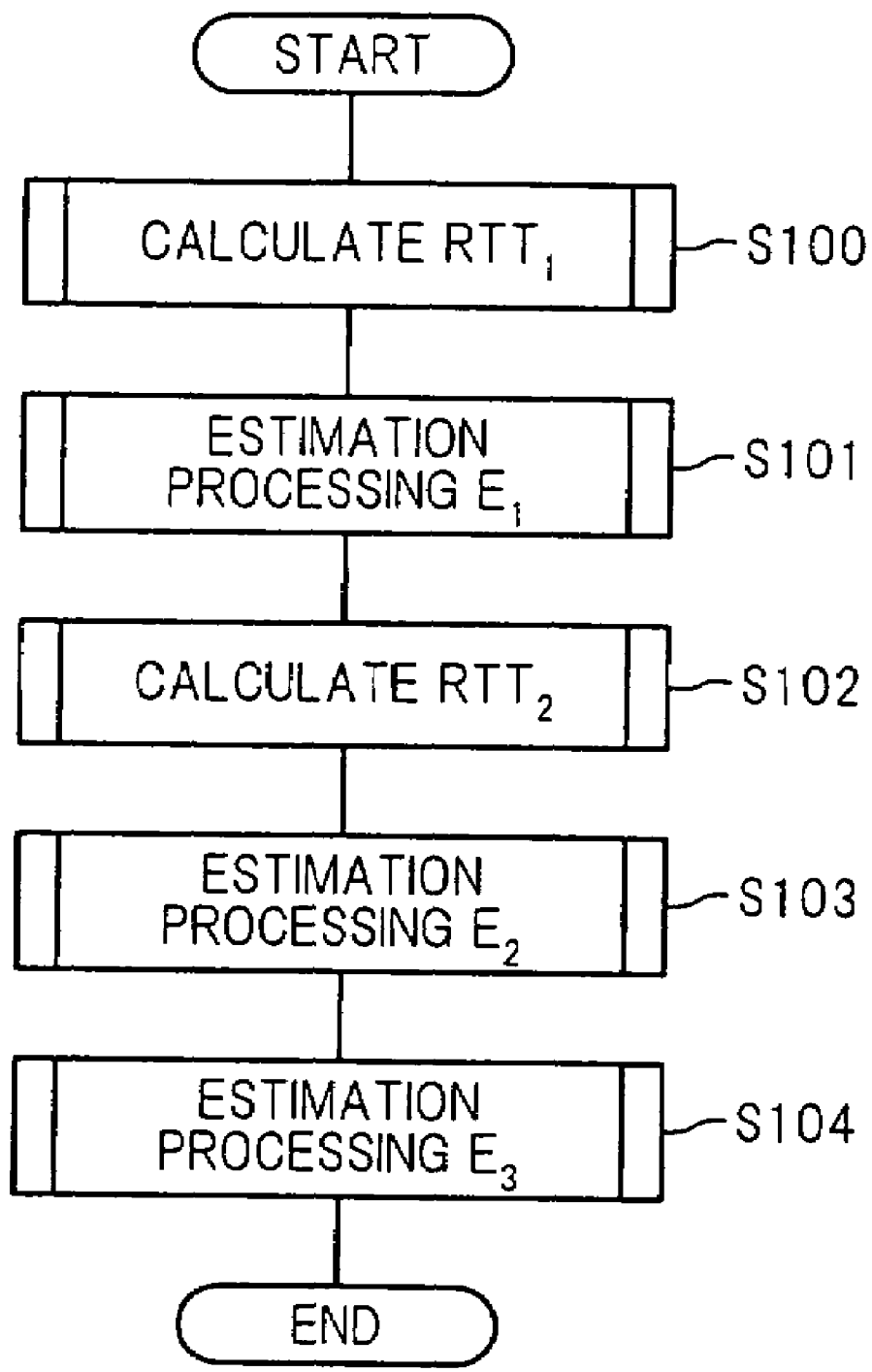
FIG. 11 is a flow chart showing the outline of the estimation control of line bandwidth by the application server in the embodiment.

FIG. 11 shows the outline of the bandwidth estimation control of the line 14 by the application server 11 in this embodiment. When the communication route through the access server 12 and the line 14 to the terminal unit 13 is set, the application server 11 sends an echo request to the terminal unit 13. Then, it receives, as a reply, an echo response from the terminal unit 13, thereby calculating the RTT, $RTT_1$, from there to the terminal unit 13 (step S100). Then, based on the counter value located in the echo response from the terminal unit 13, an estimation processing $E_1$ to estimate the number of routers from the application server 11 to the access server 12 is conducted (step S101). Then, according to the result of the estimation processing $E_1$, it sends the echo request with an initial counter value that is set to allow the access server 12 to reply the echo response, and then calculates the RTT, $RTT_2$, from there to the access server 12 (step S102).

Meanwhile, depending on the composition of the networks $N_0$ to $N_N$, the number $RN_1$ of routers in the route from the application server 11 to the terminal unit 13 may be different from the number $RN_2$ of routers in the route from the terminal unit 13 to the application server 11. Since the estimation processing $E_1$ thus estimates the number $RN_2$ of routers in the route from the terminal unit 13 to the application server 11, an estimation processing $E_2$, detailed later, checks whether this estimation is correct or not (step S103).

As a result, the data delay time t of the line 14 is calculated, and then, based on the first and second criterion tables in FIGS. 9 and 10, an estimation processing $E_3$ to determine the bandwidth of the line 14 is conducted (step S104).

The processing of the application server 11 in FIG. 11 is explained in detail below.

Figure 12:
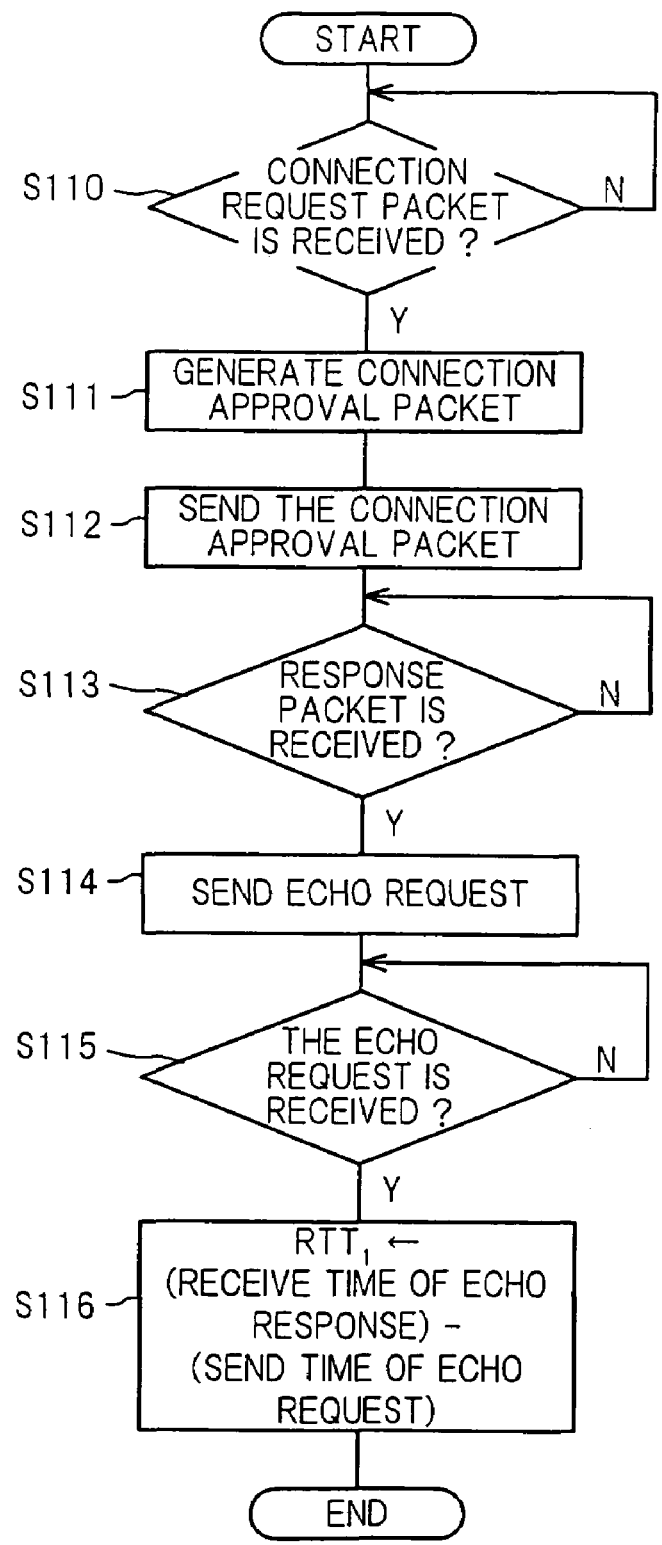
FIG. 12 is a flow chart showing an $RTT_1$ calculation processing in the embodiment.

FIG. 12 shows the outline of the $RTT_1$ calculation processing in FIG. 11. In the application server 11, the packet processing section 81 monitors the reception, through the network IF 80, of an connection request packet to request the setting of the communication route from the terminal unit 13 as explained in FIG. 4 (step S110:N). When the reception is detected (step S110:Y) and the connection through the communication route up to the terminal unit 13 is approved, the network connection processing section 82 generates the connection approval packet (step S111). In the connection approval packet, the addresses of the application server 11 and the terminal unit 13 are located in the sender address and the destination address, respectively, and data to indicate the approval is located in the IP data field. In the counter field, such a counter value as to discard the data without being stayed in the networks during a long time for some reason is located. Then, the packet processing section 81 sends the connection approval packet to the terminal unit 13 (step S112).

Thereafter, the packet processing section 81 waits for the reception of a response packet, in reply to the connection approval packet sent at step S112, sent from the terminal unit 13 (step S113:N). When the response packet is received (step S113:Y), it is judged that the communication route up to the terminal unit 13 is set, and then an echo request is generated by the echo processing section 83 and is sent to the terminal unit 13 (step S114). In the echo request, the address of the terminal unit 13 is located in the destination address, the address of the terminal unit 13 is located in the sender address, and data to indicate the echo response with the control message of ICMP is located in the IP data field. In the counter field, such a counter value as not to discard the data without being stayed in the networks during a long time for some reason is located.

After that, the echo processing section 83 waits for the reception of an echo response, in reply to the echo request sent at step S114, sent from the terminal unit 13 (step S115:N). When the echo response is received (step S115:Y), the RTT calculation processing section 84 calculates the $RTT_1$, which is an RTT up to the terminal unit 13, from send time of the echo request, at step S114 and receive time of the echo response at step S115 (step S116). The $RTT_1$ up to the terminal unit 13 is calculated by equation (2) below.

$$RTT_1 = \text{(receive time of echo response)} - \text{(send time of echo request)} \quad (2)$$

Figure 13:
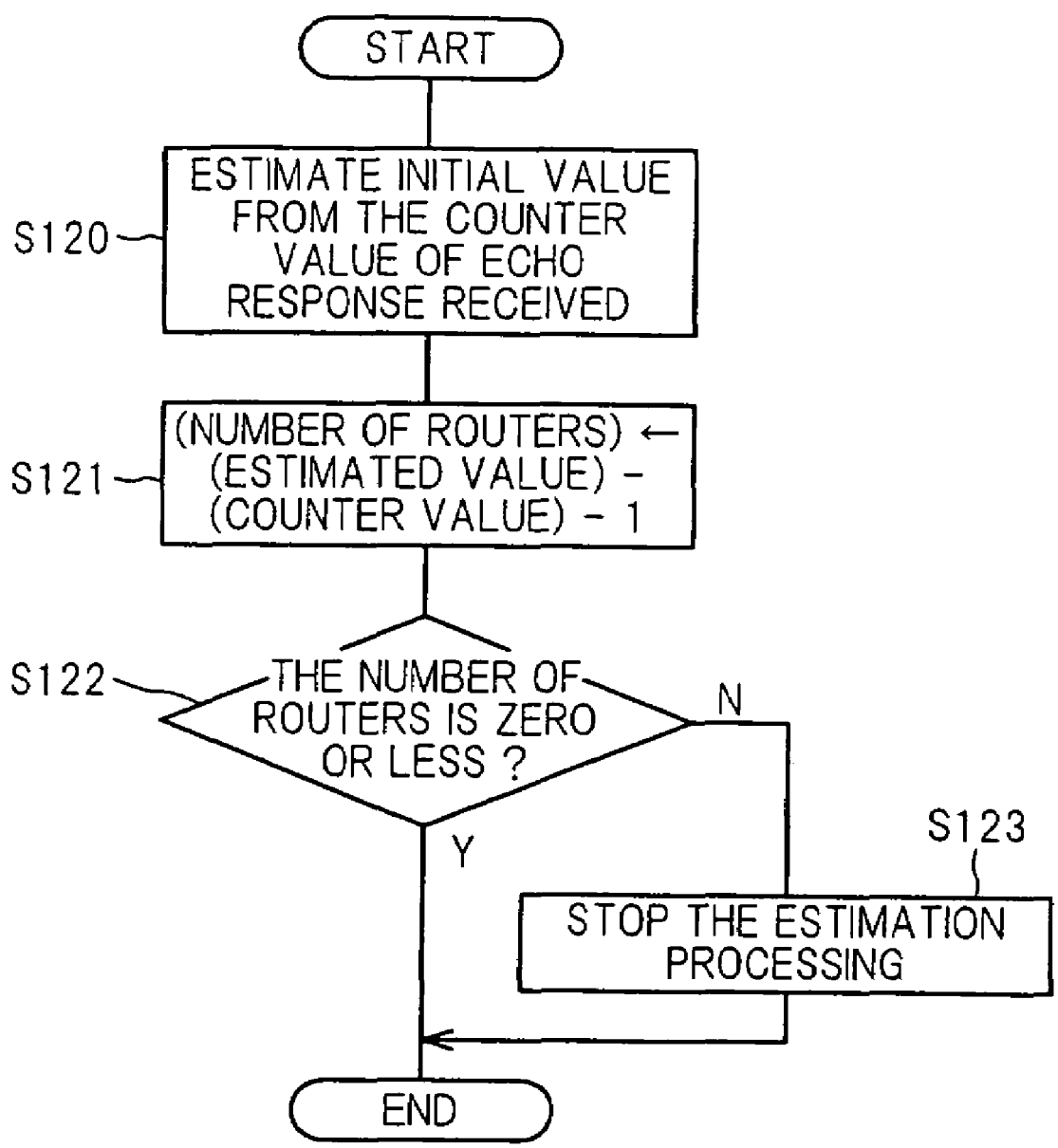
FIG. 13 is a flow chart showing an estimation processing $E_1$ in the embodiment.

FIG. 13 shows the outline of the estimation processing $E_1$ in FIG. 11. The estimation section 85 of the application server 11 first acquires the counter value in the counter field from the echo response received by the packet processing section 81. This counter value is subjected to the decrement every time the echo response, which has such an initial value as not to make the data stay in the networks during a long time for some reason to be set after the terminal unit 13 received the echo request, is passed through the access server 12 and the first to N-th routers $10_1$ to $10_N$. Since the number of routers passed through between the terminal unit 13 and application server 11 is normally less than 30, more than five bits are assigned to the counter field. Thus, as the initial value of the counter value, a numeral that is easy to estimate, e.g. "32", "128" and "255", is used. Thereby, the initial value set by the terminal unit 13 can be estimated (step S120). For example, when the counter value in the counter field of the echo response received by the application server 11 is "121", since, as described above, the number of routers passed through between the terminal unit 13 and application server 11 is normally less than 30, the initial counter value is estimated to be "128".

Then, the number of routers up to the access server 12 is calculated by equation (3) below.

$$\text{(number of routers)} = \text{(estimated initial value)} - \text{(counter value of echo response)} - 1 \quad (3)$$

Thus, when the counter value in the counter field of the echo response received by the application server 11 is "121", the number of routers up to the access server 12 is "6 (=128−121−1)".

If the number of routers calculated is zero or less (step S122:Y), since it is impossible to conduct the estimation processing, a given stop processing is conducted to stop the concerned processing (step S123). On the other hand, if the number of routers calculated is not zero (step S122:N), it proceeds to the next processing.

Figure 14:
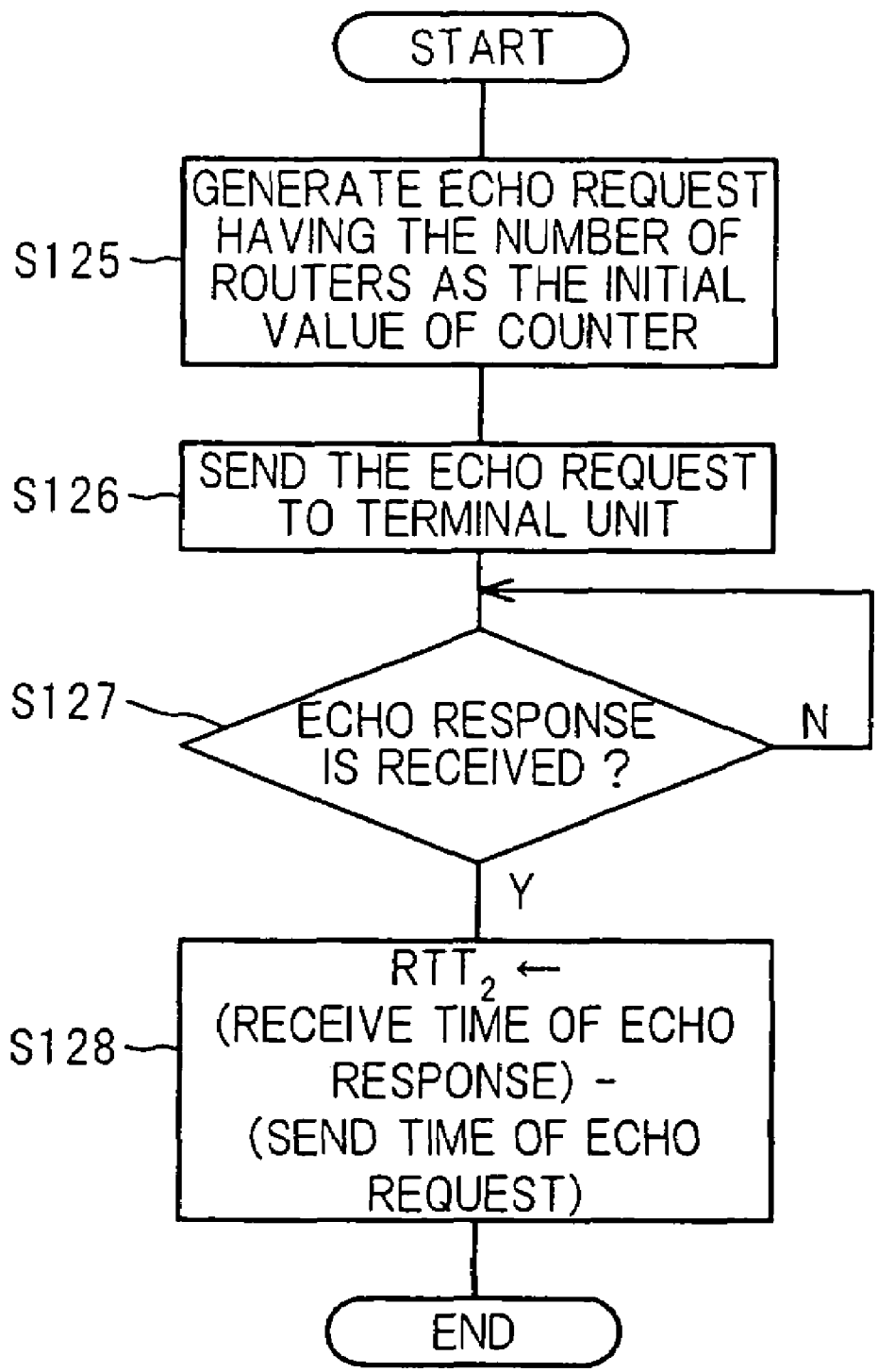
FIG. 14 is a flow chart showing an $RTT_2$ calculation processing in the embodiment.

FIG. 14 shows the outline of the $RTT_2$ calculation processing in FIG. 11. The estimation section 85 of the application server 11 generates a new echo request that the number of routers up to the access server 12 calculated by the echo processing section 83 at step S121 in FIG. 13 is set as the counter value of the counter field.

(step S125). Then, this echo request is sent to the terminal unit 13 by the packet processing section 81 (step S126). In fact, since the counter value is decremented by one at the first to N-th routers $10_1$ to $10_N$ and the access server 12, an echo response as a reply is sent from the access server 12.

On the other hand, the application server 11 waits for the reception of the echo response sent from the terminal unit 13 in reply to the echo request sent at step S126 (step S127:N). When the echo response is received (step S127:Y), the RTT calculation processing section 84 calculates the $RTT_2$, which is an RTT up to the access server 12, from send time of the echo request at step S126 and receive time of the echo response at step S127 (step S128). The $RTT_2$ up to the access server 12 is also calculated by equation (2).

Figure 15:
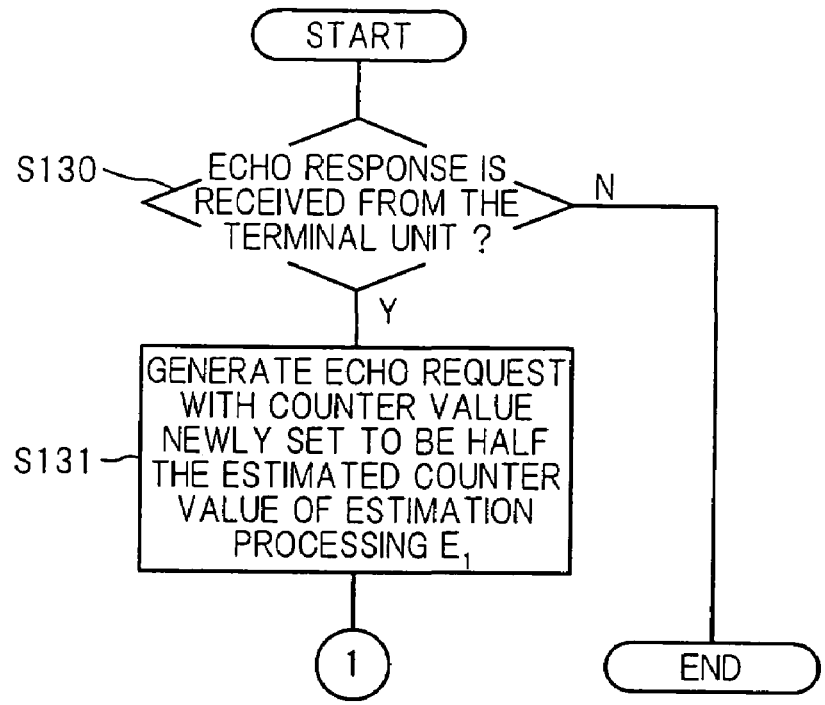
FIG. 15 is a flow chart showing an estimation processing $E_2$ in the embodiment.

FIG. 15 shows the outline of the estimation processing $E_2$ in FIG. 11. As described earlier, depending on the composition of the networks $N_0$ to $N_N$, the number $RN_1$ of routers in the route from the application server 11 to the terminal unit 13 may be different from the number $RN_2$ of routers in the route from the terminal unit 13 to the application server 11. Here, If the number $RN_1$ of routers in the route from the application server 11 to the terminal unit 13 is less than the number $RN_2$ of routers, which is estimated in the estimation processing $E_1$, in the route from the terminal unit 13 to the application server 11, the echo request sent at step S126 in FIG. 14 must reach the terminal unit 13. Therefore, by checking whether the echo response received by the application server 11 is sent from the terminal unit 13 or not, it is judged whether the estimation processing $E_1$ was correct or not.

In detail, the application server 11 checks whether the echo response received through the network IF 80 by the packet processing section 81 in reply to the echo request sent at step S126 in FIG. 14 (step S130). This can be easily conducted by referring to the sender address of the echo response received. As a result, if determined the echo response is not from the terminal unit 13 (step S130:N), it is judged that the estimation in the estimation processing $E_1$ was correct, and then the estimation processing $E_2$ is finished (end). Thus, when the number $RN_1$ of routers in the route from the application server 11 to the terminal unit 13 is larger than the number $RN_2$ of routers in the route from the terminal unit 13 to the application server 11, it is determined that the echo response is sent from the access server 12, and it proceeds to the next processing.

On the other hand, if determined the echo response is from the terminal unit 13 (step S130:Y), it is judged that the estimation in the estimation processing $E_1$ was not correct, and then an echo request that the initial counter value of the echo request at step S126 in FIG. 14 estimated in the estimation processing $E_1$ is divided by two and this value divided is newly set as the counter value of the counter field is generated. Then, returning to step S126 in FIG. 14, the $RTT$ up to the access server 12 is calculated again (step S131).

Figure 16:
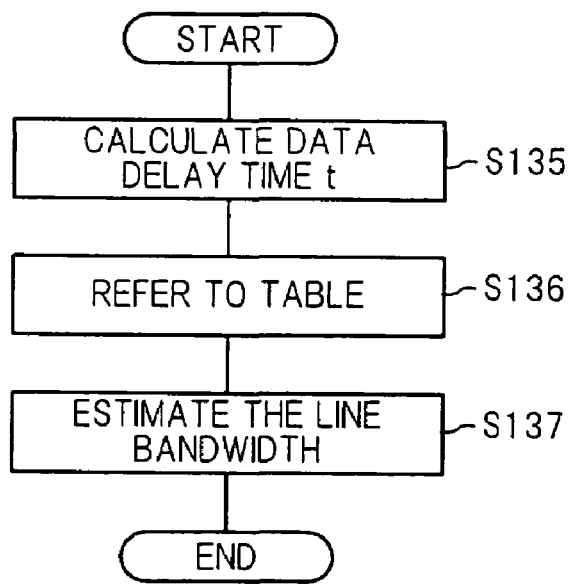
FIG. 16 is a flow chart showing an estimation processing $E_3$ in the embodiment.

FIG. 16 shows the outline of the estimation processing $E_3$ in FIG. 11. After, as explained in FIGS. 12 to 15, the $RTT_1$ up to the terminal unit 13 and the $RTT_2$ up to the access server 12 are calculated, the data delay time t of the line 14 is then calculated by equation (1), described earlier (step S135). Then, based on the data delay time t of the line 14, the network composition between the application server 11 and the terminal unit 13 is judged referring to the tables in FIGS. 9 and 10 (step S136). If judged the line 14 is of a narrow-band line in reference to FIG. 9, then the detailed line bandwidth of the line 14 with the terminal unit 13 connected is estimated in reference to FIG. 10 (step S137).

Figure 17:
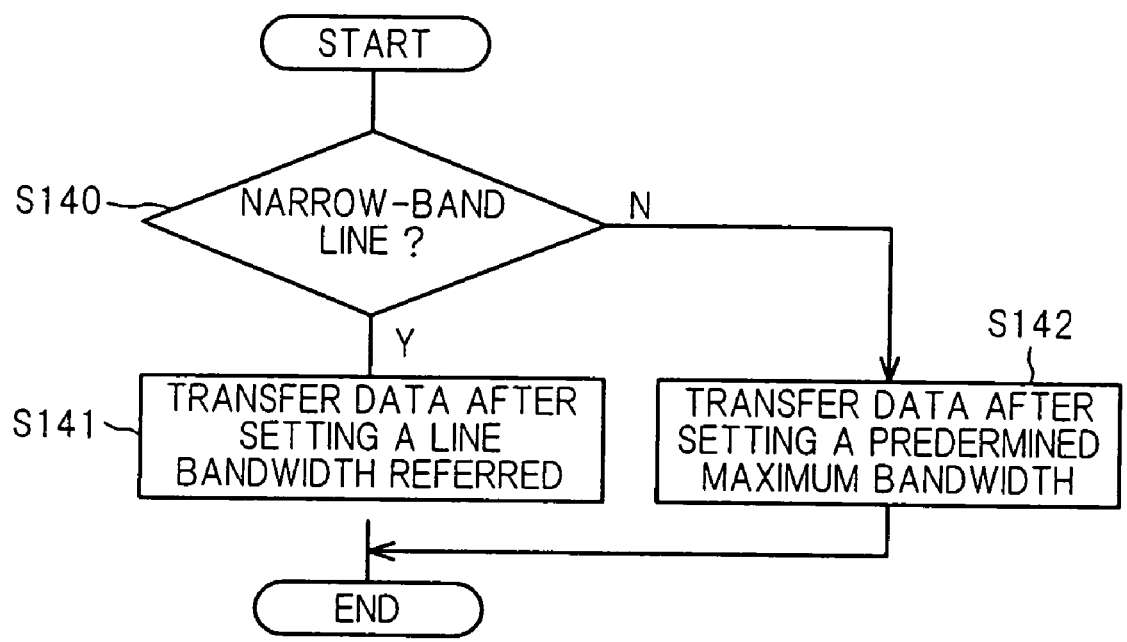
FIG. 17 is a flow chart showing the data transfer processing of the application server in the embodiment.

FIG. 17 shows the outline of the data transfer processing by the application server 11. After the bandwidth of the line 14 is estimated as shown in FIG. 16, the contents data is transferred to the terminal unit 13 as below. Namely, if judged the line 14 with the terminal unit 13 connected is of the narrow-band line in reference to FIG. 9 (step S140:Y), a specific line bandwidth is set in reference to FIG. 10, and then the contents data being requested from the terminal unit 13 is transferred therethrough (step S141). On the other hand, if judged the line 14 with the terminal unit 13 connected is not of the narrow-band line (step S140:N), the predetermined maximum bandwidth is set, and then the contents data being requested from the terminal unit 13 is transferred therethrough (step S142).

The operation of the network system in this embodiment composed as described thus far is explained below.

Figure 18:
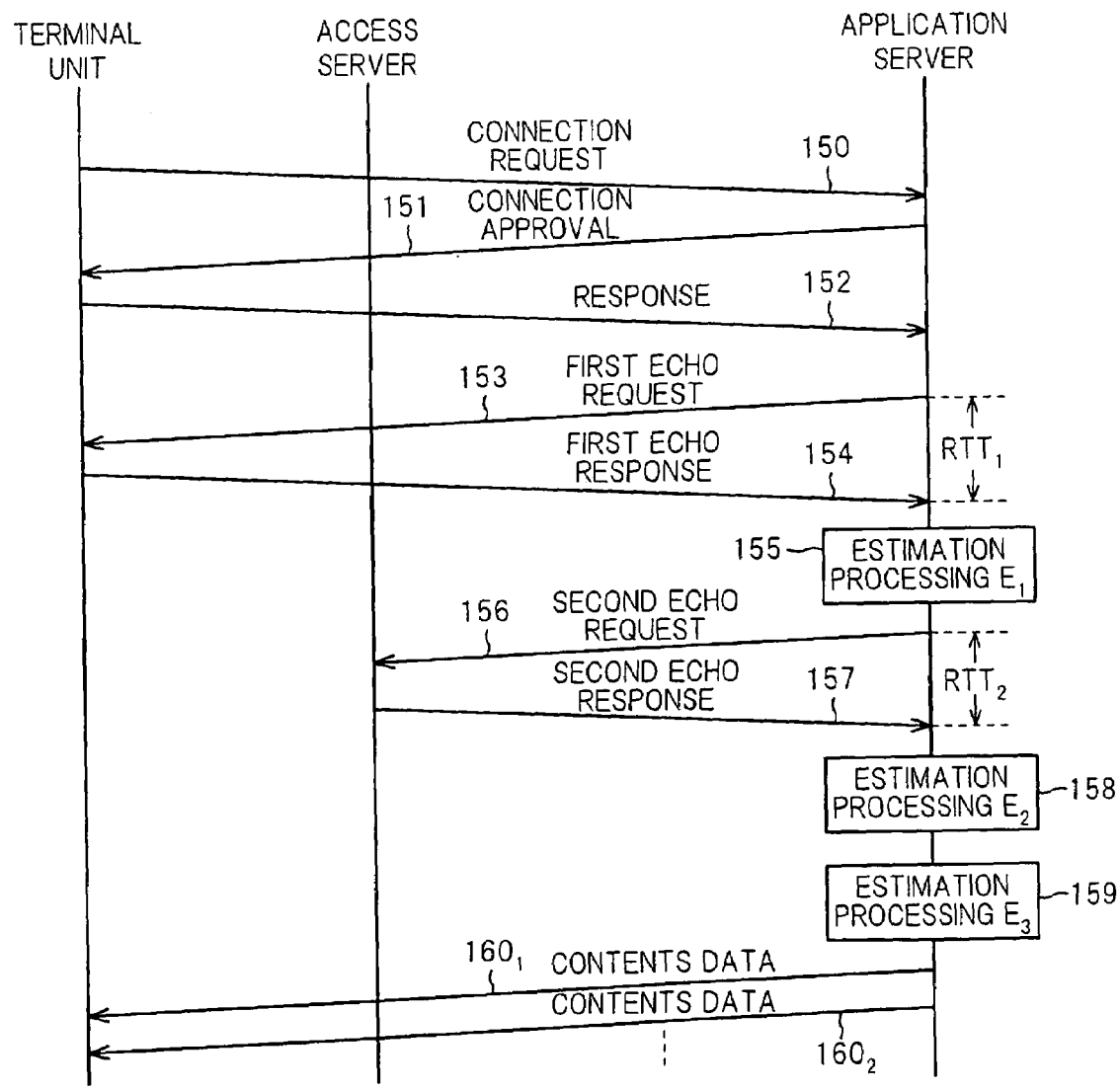
FIG. 18 is a diagram showing the operation sequence of the network system in the embodiment.

FIG. 18 shows the outline of the operation of the network system in this embodiment. In FIG. 18, defining the vertical coordinate axis as time axis, viewing from packet data being communicated among the terminal unit 13, the access server 12 and the application server 11, the operation sequence of the network system in the embodiment is shown. Given that the line 14 between the terminal unit 13 and the access server 12 is already set, when the terminal unit 13 having, e.g., a browser function acquires and browses contents data stored in the application server 11, the terminal unit 13 first sends a connection request to the application server 11 (connection request 150). This connection request is composed of IP packet data as shown in FIG. 2A and as explained in FIG. 4. Thus, the IP packet data is transferred through the access server 12, which is included in the Internet composed of the networks $N_0$ to $N_N$, to the application server 11 that is identified by an address located in the destination address of the IP packet data. When the application server 11 receives the connection request 150 from the terminal unit 13, it checks whether the connection contact concerning the terminal unit 13, the sender, exists or not. When it is confirmed that the terminal unit 13 is allowed to connect with the application server 11, the application server 11 sends a connection approval 151 as a reply. The terminal unit 13 sends a response 152 to the application server 11 to inform that of the connection approval being received.

Then, the application server 11 sends a first echo request 153 to the terminal unit 13 in order to estimate the bandwidth of the line 14 that the terminal unit 13 is connected with the access server 12. The counter value in the counter field of the first echo request 153 is set to be such an initial value as to reach the terminal unit 13 and not to make the data stay in the networks during a long time without reaching the terminal unit 13 for some reason. When the terminal unit 13 receives the first echo request 153, it sends a first echo response 154 with a destination address that is replaced by the address of the application server 11 which is the sender address of the first echo request 153. Several bits are assigned to the counter field of the first echo response 154, and, considering that the number of routers passed through between the terminal unit 13 and application server 11 is normally less than 30, a numeral that is easy to estimate, as described earlier, is set as the initial value of the counter value.

After the first echo response 154 is sent from the terminal unit 13, the counter value in the counter field of the first echo response 154 is decremented by one every time the first echo response 154 is passed through the access server 12 and the first to N-th routers $10_1$ to $10_N$ in the networks $N_0$ to $N_N$. The first echo response 154 finally reaches the application server 11 designated by the destination address. The application server 11 is enabled to clock a period from the send time of the first echo request 153 to the receive time of the first echo response 154, thereby measuring the round trip time $RTT_1$.

The application server 11 estimates the initial counter value set by the terminal unit 13 from the counter value in the counter field of the first echo response received, as well as measuring the $RTT_1$. For example, when the counter value of the first echo response 154 is "121", since the number of routers passed through between the terminal unit 13 and application server 11 is normally less than 30 and the initial value set is to be a numeral easy to estimate, "128" is estimated as the initial counter value. Therefore, the number of routers up to the access server 12 is estimated to be "6" by equation (3) (estimation processing $E_1$ 155).

Then, the application server 11 sends the terminal unit 13 a second echo request 156 that the estimated number of routers, "6", is set as the counter value in the counter field.

If the estimation above is correct, since the counter value is decremented by one every time the second echo request 156 is passed through the routers in the networks $N_0$ to $N_N$, the counter value becomes zero at the access server 12 and therefore a second echo response 157 is sent as a reply together with information that the second echo request 156 is discarded. The application server 11 measures the round trip time $RTT_2$ at the reception of the second echo response 157.

As described earlier, the number of routers in the route from the application server 11 to the terminal unit 13 may be different from the number of routers in the route from the terminal unit 13 to the application server 11. So, when receiving the second echo response 157 from the terminal unit 13, the application server 11 judges that the number of routers up to the access server 12 calculated in the estimation processing $E_1$ is not correct, and then sends the terminal unit 13 a new echo request that the initial counter value of the second echo request 156 being divided by two is set as the counter value of the counter field. Thus, the round trip time $RTT_2$ is measured. On the other hand, if the second echo response 157 is not from the terminal unit 13, the application server 11 judges that the number of routers up to the access server 12 calculated in the estimation processing $E_1$ was correct (estimation processing $E_2$ 158).

Then, the application server 11 calculates, by equation (1), the data delay time t of the line 14 from the $RTT_1$ and $RTT_2$ measured, and then estimates the network composition between the application server 11 and the terminal unit 13 in reference to the first criterion table in FIG. 9. In this process, when it is judged that the line 14 with the terminal unit 13 connected is of a narrow-band line, the bandwidth of the line 14 is further estimated, based on the data delay time t, in reference to the second criterion table in FIG. 10 (estimation processing $E_3$ 159).

When it is judged that the line 14 with the terminal unit 13 connected is thus of a narrow-band line, the application server 11 sends contents data stored inside to the terminal unit 13 according to the line bandwidth estimated from the second criterion table in FIG. 10. On the other hand, when it is judged that the line 14 with the terminal unit 13 connected is of a broad-band line, the application server 11 sends the contents data stored inside to the terminal unit 13 at the maximum bandwidth (contents data $160_1, 160_2, \ldots$).

As explained above, in the network system in this embodiment, when the terminal unit 13 acquires contents data through the line 14 connected with the access server 12 from the application server 11 that is included in the Internet composed of the networks $N_0$ to $N_N$ being connected each other through the first to N-th routers $10_1$ to $10_N$, the application server 11 sends the first echo request to the terminal unit 13, receives the first echo response sent in reply to that request, measures the round trip time $RTT_1$ up to the terminal unit 13, and estimates the number of routers between the application server 11 and the terminal unit 13 from the counter value, which is decremented by one every time being passed through one of the routers in the counter field of the echo response. Then, using the estimated number of routers, the application server 11 further sends the second echo request so as to receive a reply from the access server 12, receives the second echo response sent in reply to that request, measures the round trip time $RTT_2$ up to the access server 12. Therefore, by calculating the data delay time t of the line 14, the line bandwidth of the line 14 is estimated. Based on the line bandwidth, the contents data stored is supplied to the terminal unit 13. Thus, it is not necessary to send the connection information about the bandwidth of the line 14 etc. from the terminal unit 13. Further, without modifying the installation status of the terminal unit 13, the terminal unit 13 can be comfortably supplied with the various service data to be transferred from the application server 11. Therefore, this network system can be easily applied to the existing Internet system.

Meanwhile, the network system in this embodiment does not depend on the connection relation of the networks $N_0$ to $N_N$.

Although, in this embodiment, it is explained that the connection processing between the terminal unit 13 and the application server 11 is conducted in three-way shake hand manner, the network system of the invention is not limited to such a manner. Also, in the three-way shake hand manner, the connection approval packet of the application server 11 in reply to the connection request packet from the terminal unit 13 may be processed as the echo request and the response packet from the terminal unit 13 to the application server 11 may be processed as the echo response. In this case, the number of packets communicated in the network can be reduced, therefore the throughput can be enhanced.

Although, in this embodiment, the first criterion table in FIG. 9 uses 100 ms as the border of "large" and "small" in time for the judgement, the network system of this invention is not limited to this. For example, 90 ms may be used as the border. Namely, the border time can be a proper value to be selected according to the composition of the network system.

Although, in this embodiment, the second criterion table in FIG. 10 assumes that the packet size of echo request is around 100 bytes, the network system of this invention is not limited to this. The border of data delay time t is to be suitably altered in proportion to the packet size. Also, when the broad-band line is subject to the estimation or in order to enhance the precision of estimation, the packet size may be increased.

Also, in this embodiment, when judged the estimation in the estimation processing $E_1$ is not correct in the estimation processing $E_2$, the initial counter value of the echo request is divided by two. However, the network system of this invention is not limited to this. Alternatively, the initial counter value of the echo request may be multiplied by a value n (n is 0<n<1) to be selected to enhance the estimation precision.

In the network system of this invention, due to a convergence in the network, the second echo response may not be received by the application server 11. In this case, since the $RTT_1$ is generally larger than the $RTT_2$, if the application server 11 does not receive the second echo response when the $RTT_1$ elapses after the application server 11 sends the second echo request, the estimation processing $E_2$ may be processed determining this time-out.

Although, in this embodiment, the estimation processing $E_2$ is used to judge whether the estimation in the estimation processing $E_1$ is correct or not, the network system of this invention is not limited to this. Alternatively, in the estimation processing $E_1$ the round trip time $RTT_1$ is measured, and the round trip time $RTT_2$ is measured using the second echo request that the estimated number of routers up to the access server 12 being divided by two without any check is set as the initial count value. Thus, the estimation processing $E_2$ can be omitted. This way is useful for a case that the transmission bandwidth of the networks $N_0$ to $N_N$ is extremely larger than the bandwidth of the line 14. As a result, the processing load of the application server 11 can be reduced while offering the same estimation precision as that in this embodiment.

ADVANTAGES OF THE INVENTION

It is not necessary to send the connection information about the bandwidth of the communication line from the terminal unit. Also, the terminal unit can be comfortably supplied with the various service data to be transferred from the application server.

The data delay time of communication line is calculated from the first round trip time from the second unit to the terminal unit and the second round trip time from the second unit to the first unit. Also, there is provided the communication line bandwidth storing means that stores, in advance, the bandwidth of communication line corresponding to the data delay time of communication line, and the second unit sends data to the terminal unit according to the calculated data delay time. Therefore, in addition to the advantages advantage above, the bandwidth estimation of the communication line connected to the terminal unit can be simply conducted at a relatively high precision.

The bandwidth estimation of the communication line connected to the terminal unit is conducted using the echo request and echo response. Therefore, without modifying the installation status of the terminal unit, the network system of this invention can be easily applied to the existing Internet system.

The application server checks whether the second echo response is from the terminal unit or not. When judged it is from the terminal unit, the application server determines that the estimated number of routers is not correct because the number of routers in the route from the application server to terminal unit is less than the number of routers in the route from the terminal unit to the application server. Then, it sends again the second echo request with the initial counter value of a less value by the re-send control means, thereby measuring the second round trip time. Thus, the bandwidth estimation precision of the communication line connected to the terminal unit can be enhanced.

The processing of the application server can be simplified, thereby the data transfer can be conducted efficiently even in case of a narrow-band line that is likely to be subject the convergence of network. Also, in case of a broad-band line, the terminal unit can receive data more comfortably.

In a case that the connection processing to be conducted prior to the data transfer from the application server to the terminal unit is conducted in three-way shake hand manner, the connection approval packet of the application server in reply to the connection request packet from the terminal unit is processed as the first echo request and the response packet from the terminal unit to the application server is processed as the first echo response. Thereby, the number of packets communicated in the network can be reduced, therefore the throughput can be enhanced.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A network system, comprising:
    a terminal unit that sends an echo response with a predetermined counter value to the sender of a predetermined echo request;
    an access server that couples said terminal unit through a communication line and routes data and said echo request to be communicated between said terminal unit and said access server, decrements a count value of the echo request every time repeating the echo request, and, when the count value becomes zero, sends an echo response to the sender of the echo request;
    one or more routers that are connected to said access server and that routes data and said echo request to be communicated between said terminal unit and said routers, decrements a count value of the echo request every time repeating the echo request, and, when the count value becomes zero, sends an echo response to the sender of the echo request; and
    an application server that is connected to any one of said routers, said application server comprising,
    a first echo request sending means that sends a first echo request to said terminal unit,
    a first echo response receiving means that receives a first echo response in reply to the first echo request from said terminal unit,
    a first measuring means that measures a first round trip time as a data delay time between said terminal unit and said application server, said first round trip time being an elapsed time from send time of the first echo request until receive time of the first echo response,
    an estimating means that estimates the number of routers up to said access server from a counter value of the first echo response received by said first echo response receiving means,
    a second echo request sending means that sends a second echo request with a count value that is set to be the number of routers estimated by said estimating means to said terminal unit,
    a second echo response receiving means that receives a second echo response in reply to the second echo request,
    a second measuring means that measures a second round trip time as a data delay time between said access server and said application server, said second round trip time being an elapsed time from send time of the second echo request until receive time of the second echo response,
    a communication line delay calculating means that calculates a data delay time of said communication line from the first and second round trip times measured by said first and second measuring means, respectively,
    a communication line bandwidth storing means that stores a bandwidth of said communication line corresponding to the data delay time of said communication line, and
    a data sending means that sends data to said terminal unit according to the bandwidth of said communication line stored in said communication line bandwidth storing means corresponding to the data delay time calculated by said communication line delay calculating means.

2. A network system, according to claim 1, wherein:
    said application server comprises,
    an echo response judging means that judges whether the second echo response received by said second echo response receiving means is sent from said terminal unit or not, and
    a re-sending means that, when said echo response judging means judges that the second echo response received by said second echo response receiving means is sent from said terminal unit, makes said second echo request sending means send another second echo request with a count value that is set to be less than the number of routers estimated by said estimating means to said terminal unit.

3. A network system, according to claim 2, wherein:
said application server comprises a data sending means that, a data delay time of the communication line calculated by said communication line delay calculating means is larger than a predetermined threshold value, sends data to said terminal unit based on a bandwidth stored in said communication line bandwidth storing means in accordance with the data delay time, and, when the data delay time of the communication line calculated is smaller than the predetermined threshold value, sends data to said terminal unit at a maximum bandwidth in the communication line.

4. A network system, according to claim 2, wherein:
said terminal unit comprises,
a connection request sending means that sends a connection request to said application server prior to receiving data from said application server, and
a responding means that receives a connection approval in reply to the connection request as the first echo request and sends a response in reply to the connection approval as the first echo response; and
said application server comprises,
a transmitting means that sends the connection approval in reply to the connection request sent from said connection request sending means as the first echo request, and
a communication line setting means that receives the response sent from said responding means as the first echo response and sets up a communication line between said terminal unit and said application server.

5. A network system, according to claim 1, wherein:
said application server comprises a data sending means that, a data delay time of the communication line calculated by said communication line delay calculating means is larger than a predetermined threshold value, sends data to said terminal unit based on a bandwidth stored in said communication line bandwidth storing means in accordance with the data delay time, and, when the data delay time of the communication line calculated is smaller than the predetermined threshold value, sends data to said terminal unit at a maximum bandwidth in the communication line.

6. A network system, according to claim 5, wherein:
said terminal unit comprises,
a connection request sending means that sends a connection request to said application server prior to receiving data from said application server, and
a responding means that receives a connection approval in reply to the connection request as the first echo request and sends a response in reply to the connection approval as the first echo response; and
said application server comprises,
a transmitting means that sends the connection approval in reply to the connection request sent from said connection request sending means as the first echo request, and
a communication line setting means that receives the response sent from said responding means as the first echo response and sets up a communication line between said terminal unit and said application server.

7. A network system, according to claim 1, wherein:
said terminal unit comprises,
a connection request sending means that sends a connection request to said application server prior to receiving data from said application server, and
a responding means that receives a connection approval in reply to the connection request as the first echo request and sends a response in reply to the connection approval as the first echo response; and
said application server comprises,
a transmitting means that sends the connection approval in reply to the connection request sent from said connection request sending means as the first echo request, and
a communication line setting means that receives the response sent from said responding means as the first echo response and sets up a communication line between said terminal unit and said application server.

8. A network system, comprising:
a communication line having a predetermined bandwidth;
a terminal unit that is connected to said communication line and receives data through the communication line;
a first unit that couples said terminal unit through said communication line and routes data to be communicated between said terminal unit and said first unit; and
a second unit that sends data to said terminal unit through said first unit according to the bandwidth of said communication line that is estimated based on a data delay time of said communication line,
wherein said second unit includes,
a first measuring means that is connected to said first unit and measures a first round trip time as a data delay time between said terminal unit and said second unit,
a second measuring means that measures a second round trip time as a data delay time between said first unit and said second unit,
a communication line delay calculating means that calculates the data delay time of said communication line from said first and second round trip times measured by said first and second measuring means, respectively,
a communication line bandwidth storing means that stores a bandwidth of said communication line corresponding to the data delay time of said communication line, and
a data sending means that sends data to said terminal unit according to the bandwidth of said communication line stored in said communication line bandwidth storing means corresponding to the data delay time calculated by said communication line delay calculating means.

9. A network system, comprising:
a communication line having a predetermined bandwidth;
a terminal unit that is connected to said communication line and receives data through the communication line;
a first unit that couples said terminal unit through said communication line and routes data to be communicated between said terminal unit and said first unit; and
a second unit that sends data to said terminal unit through said first unit according to the bandwidth of said communication line that is estimated based on a data delay time of said communication line,
wherein said second unit includes a first table that indicates whether said communication line is a narrow band line based on inputs of the data delay time in said communication line and a round trip time of data between said first unit and said second unit, and
wherein said second unit further includes a second table that outputs, when said first table indicates that said communication line is a narrow band line, a numerical estimate of the bandwidth of said communication line based solely on the data delay time in said communication line.

* * * * *